United States Patent

Miyazawa et al.

[11] Patent Number: 5,917,267
[45] Date of Patent: *Jun. 29, 1999

[54] LINEAR DRIVE MECHANISM USING ELECTROMECHANICAL CONVERSION ELEMENT

[75] Inventors: Masayuki Miyazawa, Kawachinagano; Yasuhiro Okamoto, Tondabayashi; Minoru Kurosawa, Yokohama, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,594

[22] Filed: Jan. 3, 1997

[30] Foreign Application Priority Data

Jan. 4, 1996 [JP] Japan .................................. 8-014757

[51] Int. Cl.$^6$ ...................................................... H02N 2/00
[52] U.S. Cl. ........................................ 310/317; 310/323
[58] Field of Search .................................. 310/317, 323, 310/328

[56] References Cited

U.S. PATENT DOCUMENTS

| | | | |
|---|---|---|---|
| 3,902,084 | 8/1975 | May | 310/328 |
| 4,195,243 | 3/1980 | Thaxter | 310/328 |
| 4,527,105 | 7/1985 | Shiraishi | 318/444 |
| 4,692,672 | 9/1987 | Okuno | 310/317 |
| 4,743,789 | 5/1988 | Puskas | 310/316 |
| 4,894,579 | 1/1990 | Higuchi et al. | 310/328 |
| 4,952,834 | 8/1990 | Okada | 310/316 |
| 4,954,741 | 9/1990 | Furutsu et al. | 310/316 |
| 5,050,587 | 9/1991 | Sagara et al. | 310/323 |
| 5,198,732 | 3/1993 | Morimoto | 318/116 |
| 5,225,941 | 7/1993 | Saito et al. | 310/320 |
| 5,237,237 | 8/1993 | Ueda et al. | 310/317 |
| 5,416,374 | 5/1995 | Inoue et al. | 310/317 |
| 5,459,370 | 10/1995 | Kataoka | 310/317 |
| 5,479,063 | 12/1995 | Suganuma | 310/316 |
| 5,539,268 | 7/1996 | Kataoka | 310/316 |
| 5,563,464 | 10/1996 | Okubu et al. | 310/316 |
| 5,585,686 | 12/1996 | Kataoka | 310/341 |

*Primary Examiner*—Thomas M. Dougherty
*Attorney, Agent, or Firm*—McDermott, Will & Emery

[57] ABSTRACT

A drive mechanism comprises an electromechanical conversion element, drive member fixedly attached to said electromechanical conversion element, driven member friction-bonded to said drive member, and a drive pulse generator for accomplishing telescopic displacement of said electromechanical conversion element, wherein telescopic displacement comprising expansion and contraction at different speeds is generated in said electromechanical conversion element via said drive pulse generating means to produce movement of the driven members friction-bonded to said drive member, and wherein said drive pulse generator is provided with a means for controlling the time a drive pulse is applied to said electromechanical conversion element so as to control the electrical load applied to said electromechanical conversion element by controlling the time of said application, and thereby control the driving speed.

12 Claims, 12 Drawing Sheets

FIG. 18 ize the previously described disadvantages by reducing the marked change in speed produced at the driving starts, driving stops, and driving direction is reversed.

LINEAR DRIVE MECHANISM USING ELECTROMECHANICAL CONVERSION ELEMENT

BACKGROUND OF THE INVENTION

1. Field of the Invention

The present invention relates to a linear drive mechanism using an electromechanical conversion element for moving mechanical components of cameras and other precision machines.

2. Description of the Related Art

When a drive pulse comprising a moderately rising part followed by a sharply falling part is applied to a piezoelectric element, a displacement extending in the thickness direction of the piezoelectric element is gently generated by the moderately rising part of the drive pulse, and a sharp compression displacement is generated by the sharply falling part of the drive pulse. Linear drive mechanisms are known which use this characteristic to generate a linear movement of a movable member friction-bonded to a drive member by applying a drive pulse of the aforesaid waveform to a piezoelectric element and repeatedly discharging at different speeds to produce vibration in the piezoelectric element in the thickness direction at different speeds, thereby reciprocally moving at different speeds a drive member fixedly attached to said piezoelectric element (e.g., Japanese Laid-Open Patent Application Nos. HEI 4-69070 and HEI 6-123830).

Figure 14:
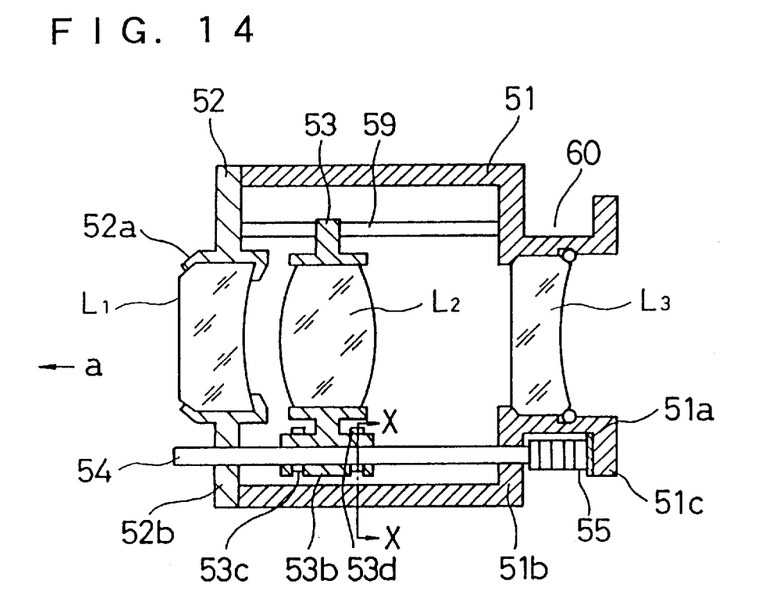
FIG. 14 is a section view showing the construction of a conventional drive mechanism using a piezoelectric element.

Among the aforesaid drive mechanisms, FIG. 14 shows an example of the construction of a photographic lens drive mechanism of a camera using the aforesaid type of linear drive mechanism. In FIG. 14, reference number 51 refers to a lens barrel at the left end of which is fixedly mounted a holding frame 52 of a first lens L1, and at the right end of which is formed a holding frame 51a of a third lens L3. A holding frame 53 of a second lens L2 is disposed within lens barrel 51 so as to be movable in the optical axis direction. Reference number 54 refers to a drive shaft for driving lens holding frame 53 in the optical axis direction, said drive shaft 54 being supported by a first flange 51b of lens barrel 51 and a flange 52b of lens holding frame 52 so as to be movable in the optical axis direction, and one surface of a piezoelectric element 55 is fixedly adhered to one end of said drive shaft 54.

Piezoelectric element 55 is displaced in the thickness direction, thereby displacing drive shaft 54 in the axial direction; one end of piezoelectric element 55 is fixedly adhered to drive shaft 54, and the other end of piezoelectric element 55 is fixedly adhered to the second flange 51c of lens barrel 51.

Figure 15:
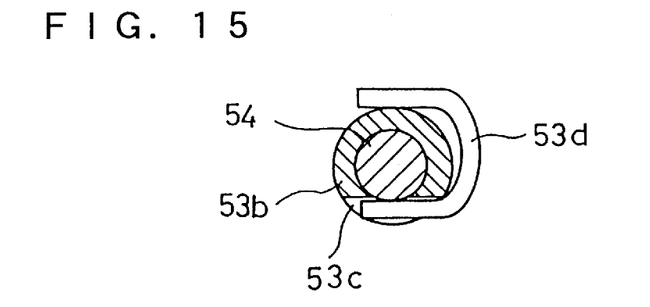
FIG. 15 is an enlarged section view showing a part of the drive mechanism of FIG. 14.

The lens holding frame 53 supporting the second lens L2 is provided with a contact member 53b as a movable member extending in a downward direction, and drive shaft 54 passes through said contact member 53b. A notch 53c is formed on the bottom surface of the contact member 53b. The contact member 53b and drive shaft 54 are friction-bonded by a suitable friction force via pressure contact of a pressure spring 53d inserted between the top surface of contact member 53b and the notch groove 53c. FIG. 15 shows the construction of the contact portion between drive shaft 54 and contact member 53b; the view is a section view along the X—X line of FIG. 14.

Another notch (not shown in FIG. 14) is formed at the top of lens holding frame 53, and engages a guide shaft 59 so as to prevent rotation of lens holding frame 53. Reference number 60 refers to a mount for attaching the lens to a camera.

Figure 16:
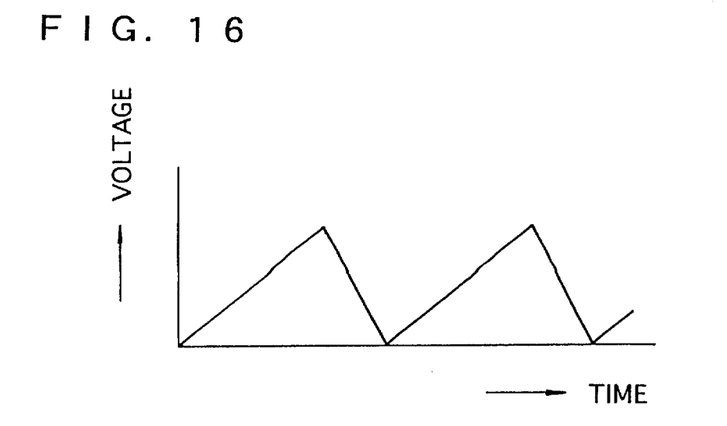
FIG. 16 illustrates a typical drive pulse waveform.

The control operation is described hereinafter. When it is necessary to move lens L2 in the arrow a direction, a drive pulse having a waveform comprising a moderately rising part followed by a sharply falling part is applied to piezoelectric element 55, as shown in FIG. 16.

The piezoelectric element 55 generates a moderate displacement extending in the thickness direction, and displaces the drive shaft 54 in the axial direction indicated by arrow a. Thus, lens holding frame 53 can be moved in the arrow a direction because pressure spring 53d presses against drive shaft 54 so as to produce a frictional bond with contact member 53b of lens holding frame 53 and causing movement in the arrow a direction.

The sharply falling part of the drive pulse generates a rapid compression displacement in the thickness direction of piezoelectric element 55, such that drive shaft 54 is also displaced in an opposite axial direction to the direction of arrow a. At this time, lens holding frame 53 does not move because the contact member 53b of lens holding frame 53 pressed against drive shaft 54 by pressure spring 53d substantially stays at said position due to the inertial force produced by the friction force between said contact member 53b and drive shaft 54.

In this case "substantially" pertains to movement in the arrow a direction and the opposite direction producing a follow-up movement of slipping of the frictional bonded surfaces between drive shaft 54 and the contact member 53b of lens holding frame 53, and includes an overall movement in the arrow a direction caused by the difference in drive times.

The lens holding frame 53 can be consecutively moved in the arrow a direction by applying consecutive drive pulses of the aforesaid waveform to piezoelectric element 55.

When moving the lens holding frame 53 in the opposite direction to the arrow a direction, such movement can be accomplished by applying to piezoelectric element 55 a drive pulse having a waveform comprising a sharply rising part followed by a moderately falling part.

In the linear drive mechanism using a piezoelectric element as described above, no vibration noise is heard when a drive pulse above 20 KHz is used which exceeds the audible frequency range because the vibration noise generated when the piezoelectric element is drive by such a drive pulse is undetectable to humans.

Figure 17:
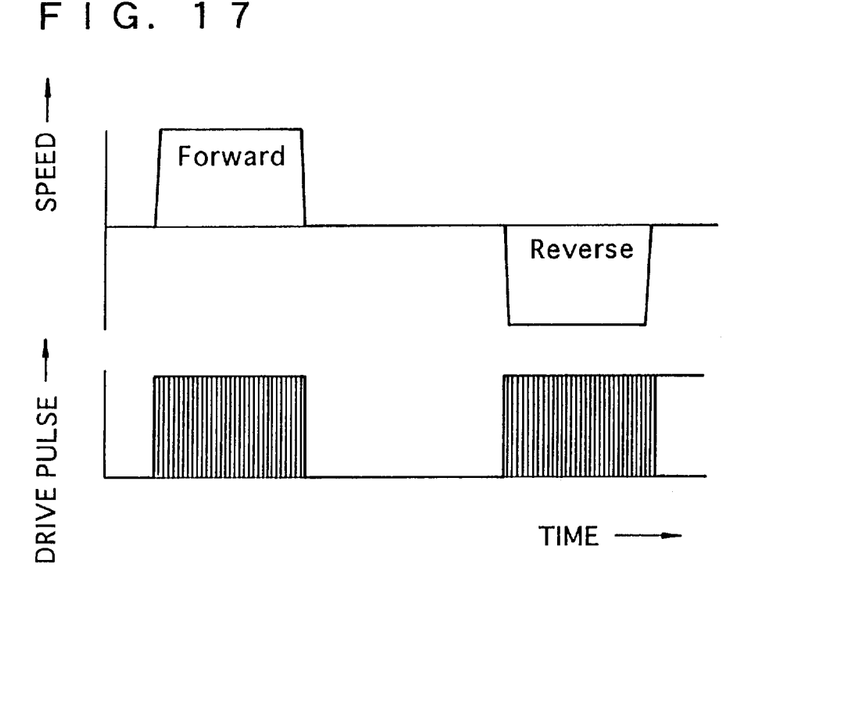
FIG. 17 is a timing chart illustrating the operation of a conventional drive mechanism.
Figure 18:
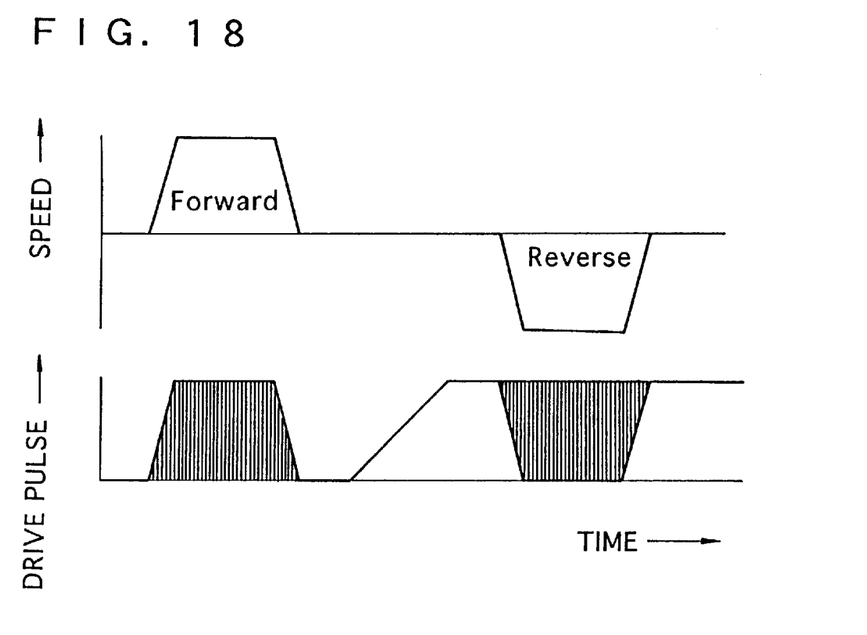
FIG. 18 is a timing chart illustrating the operation of the drive mechanism of the present invention.

When driving, stopping, and reversing the drive mechanism, ON/OFF control is executed to apply a drive pulse to the piezoelectric element or turn off the drive pulse to the piezoelectric element. Disadvantages arise, however, when the ON/OFF control of the drive pulse to the piezoelectric element is executed as shown in FIG. 17, inasmuch as impact noise is produced due to the marked change in drive speed when the moving members rapidly accelerate or stop due to the excellent responsiveness of this type of linear drive mechanism.

Further disadvantages arise insofar as resonance noise is generated by frequency-induced resonation of the drive mechanism when the frequency of the drive pulse is altered to change the driving speed, and such resonance also reduces the durability of the drive mechanism.

SUMMARY OF THE INVENTION

A main object of the present invention is to eliminate the previously described disadvantages by reducing the marked change in speed produced at the driving starts, driving stops, and driving direction is reversed.

Another object of the present invention is to reduce the impact noise produced when driving starts, driving stops, and the driving direction is reversed.

A still further object of the present invention is to reduce the vibration noise which accompanies resonance and impact noise caused when driving starts, driving stops, and the driving direction is reversed.

The present invention achieves these objects by controlling the electric load of the drive pulse applied to the piezoelectric element so as to gradually increase or decrease said load to smoothly move, stop, or reverse the drive member and moving members without causing marked speed changes.

The present invention provides a drive mechanism using an electromechanical conversion element comprising an electromechanical conversion element, drive member fixedly attached to said electromechanical conversion element, driven member friction-bonded to said drive member, and a drive pulse generating means for accomplishing telescopic displacement of said electromechanical conversion element, wherein telescopic displacement comprising expansion and contraction at different speeds is generated in said electromechanical conversion element via said drive pulse generating means to produce movement of the driven members friction-bonded to said drive member, and wherein said drive pulse generating means is provided with a means for controlling the time a drive pulse is applied to said electromechanical conversion element so as to control the electrical load applied to said electromechanical conversion element by controlling the time of said application, and thereby control the driving speed.

The aforesaid drive pulse generating means accomplishes control to gradually increase or decrease the time a drive pulse is applied to said electromechanical conversion element when the drive mechanism starts driving and stops driving so as to control the electrical load applied to said electromechanical conversion element by gradually increasing or decreasing said application time, and thereby gradually increase or decrease the driving speed. Similar control is also accomplished when the driving is temporarily stopped to reverse the driving direction.

The present invention provides a drive mechanism using an electromechanical conversion element comprising an electromechanical conversion element, drive member fixedly attached to said electromechanical conversion element, driven member friction-bonded to said drive member, and a drive pulse generating means for accomplishing telescopic displacement of said electromechanical conversion element, wherein telescopic displacement comprising expansion and contraction at different speeds is generated in said electromechanical conversion element via said drive pulse generating means to produce movement of the driven members friction-bonded to said drive member, and wherein said drive pulse generating means is provided with a means for controlling a drive pulse voltage applied to said electromechanical conversion element so as to control the electrical load applied to said electromechanical conversion element by controlling the drive pulse voltage, and thereby control the driving speed.

The aforesaid drive pulse generating means accomplishes control to gradually increase or decrease the drive pulse voltage applied to said electromechanical conversion element when the drive mechanism starts driving and stops driving so as to control the electrical load applied to said electromechanical conversion element by gradually increasing or decreasing the electrical load applied to said electromechanical conversion element, and thereby gradually increase or decrease the driving speed. Similar control is also accomplished when the driving is temporarily stopped to reverse the driving direction.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
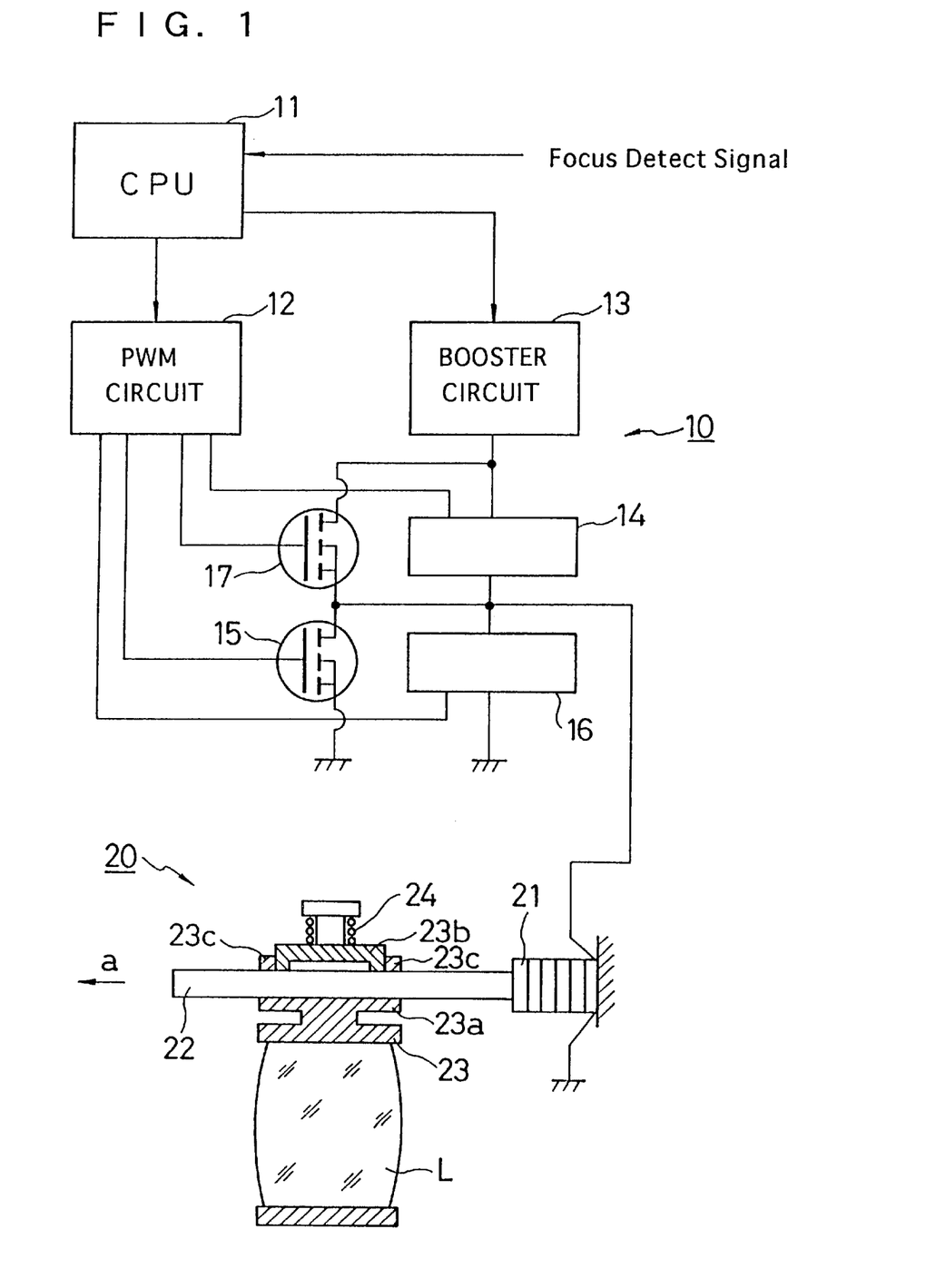
FIG. 1 is a block diagram of the drive circuit of the drive mechanism using a piezoelectric element of a first embodiment of the invention.

The preferred embodiments of the present invention are described hereinafter with reference to the accompanying drawings. FIG. 1 is a block diagram of the drive circuit and drive mechanism using a piezoelectric element of the present invention. The drive circuit can be applied to a linear drive mechanism using a piezoelectric element such as that of the previously mentioned conventional example shown in FIG. 14.

In FIG. 1, reference number 11 refers to a central processing unit (CPU) for controlling drive circuit 10; focus detection signals output from a focus detection circuit in the camera body (not illustrated) are input to the input port of said CPU 11. A pulse width modulation (PWM) circuit 12, and booster circuit 13 are connected to output ports of CPU 11. Reference numbers 15 and 17 are field effect transistors (FET), which rapidly charge and discharge piezoelectric element 21. Reference numbers 14 and 16 refer to constant current circuits which slowly charge and discharge piezoelectric element 21 at predetermined constant currents. These FET 15 and 17 and constant current circuits 14 and 16 are controllably turned ON/OFF via PWM signals output from PWM circuit 12 which operates based on a duty ratio (ON/OFF time ratio) determined by CPU 11.

Since drive mechanism 20 driven by drive circuit 10 has a construction unchanged from that described in FIG. 14, further description of the drive mechanism is abbreviated. On end of piezoelectric element 21 is fixedly attached to a lens barrel (not shown in the illustration), and the other end of piezoelectric element 21 is fixedly attached to a drive shaft 22. Drive shaft 22 is supported by bearing not shown in the illustrations so as to be movable in the axial direction.

A contact member 23a and contact member 23b for making friction contact with drive shaft 22 are provided at the top of lens holding frame 23 which supports lens L, and said drive shaft 22 passes through the center are between both said members. That is, Contact member 23a is integratedly formed with lens holding frame 23 so as to make contact with the bottom half of drive shaft 22. Contact member 23b engages a slot 23c of lens holding frame 23 so as to make contact with the top half of drive shaft 22, and is pressed against driver shaft 22 via a spring 24 connected to said holding frame 23. Thus, the contact members 23a and 23b are friction-bonded to drive shaft 22 via a suitable friction force by means of the aforesaid construction.

The control operation of drive circuit 10 is described hereinafter with reference to the timing chart shown in FIGS. 2 and 3. First, the control operation is described when in a normal drive state of the drive mechanism with a drive pulse having the waveform shown in the timing chart (a) of FIG. 2 is applied to slowly charge and rapidly discharge piezoelectric element 21.

In the normal drive state, PWM circuit 12 and booster circuit 13 are in operational states, and PWM circuit 12 outputs PWM signals (ON/OFF control signals) to constant current circuit 14 and FET 15 based on a predetermined duty ratio D suitable for normal operation and determined by CPU 11. At this time, constant current circuit 16 and FET 17 are turned OFF (refer to FIGS. 2(d) and 2(e)).

Figure 2:
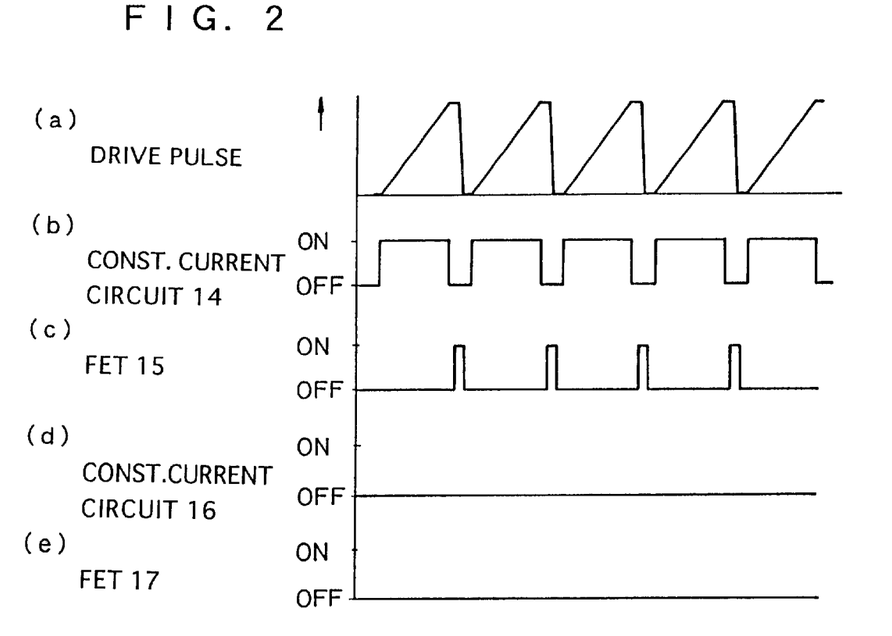
FIG. 2 is part 1 of a timing chart of the drive circuit showing the normal driving state of the first embodiment.

Constant current circuit 14 is turned ON/OFF by the timing shown in FIG. 2(b) via PWM signals output from PWM circuit 12; when constant current circuit 14 is turned ON, the output from initial booster circuit 13 passes through constant circuit 14 and charges piezoelectric element 21 with a constant current. FET 15 is turned ON/OFF by the timing shown in FIG. 2(c) via PWM signals output from PWM circuit 12; the electrical load charged to piezoelectric element 21 is rapidly discharged because continuity is attained in the ON state only.

As described above, since piezoelectric element 21 is slowly charged and rapidly discharged, a drive pulse having a waveform shown in timing chart (a) of FIG. 2 is applied to piezoelectric element 21. When piezoelectric element 21 is slowly charging, a slow expansion displacement in the thickness direction is generated in piezoelectric element 21 by the moderately rising part of the drive pulse, so as to displace drive shaft 22 in the axial direction indicated by arrow a. Thus, lens holding frame 23 is also moved in the arrow a direction because lens holding frame 23 is friction-bonded to drive shaft 22 via pressure applied by pressure spring 24.

During the rapid discharge of piezoelectric element 21, a rapid compression displacement is generated in the thickness direction of piezoelectric element 21 by the sharply falling part of the drive pulse, so as to displace drive shaft 22 in the axial direction opposite to the direction indicated by arrow a. At this time, contact members 23a and 23b of lens holding frame 23 which are pressed against drive shaft 22 via pressure spring 24 substantially remain at said position due to the friction force between said contact members and the drive shaft 22 via the force of inertia, such that lens holding frame 23 does not move.

In this case "substantially" pertains to movement in the arrow a direction and the opposite direction producing a follow-up movement of slipping of the frictional bonded surfaces between the drive shaft and the contact members of the lens holding frame, and includes an overall movement in the arrow a direction caused by the difference in drive times.

The lens holding frame 23 can be consecutively moved in the arrow a direction by applying consecutive drive pulses of the aforesaid waveform to piezoelectric element 21.

The control operation is described below when a drive pulse of the waveform show in the timing chart (a) of FIG. 3 to rapidly discharge and slowly charge piezoelectric element 21 to move lens holding frame 23 in the opposite direction to the arrow a direction.

When PWM circuit 12 and booster circuit 13 are in the operational state, PWM circuit 12 outputs PWM signals (ON/OFF control signals) to constant current circuit 16 and FET 17 based on a predetermined duty ratio suitable for normal driving and set by CPU 11. At this time, constant current circuit 14 and FET 17 are maintained in the OFF state (refer to FIGS. 3(b) and 3(c)).

Figure 3:
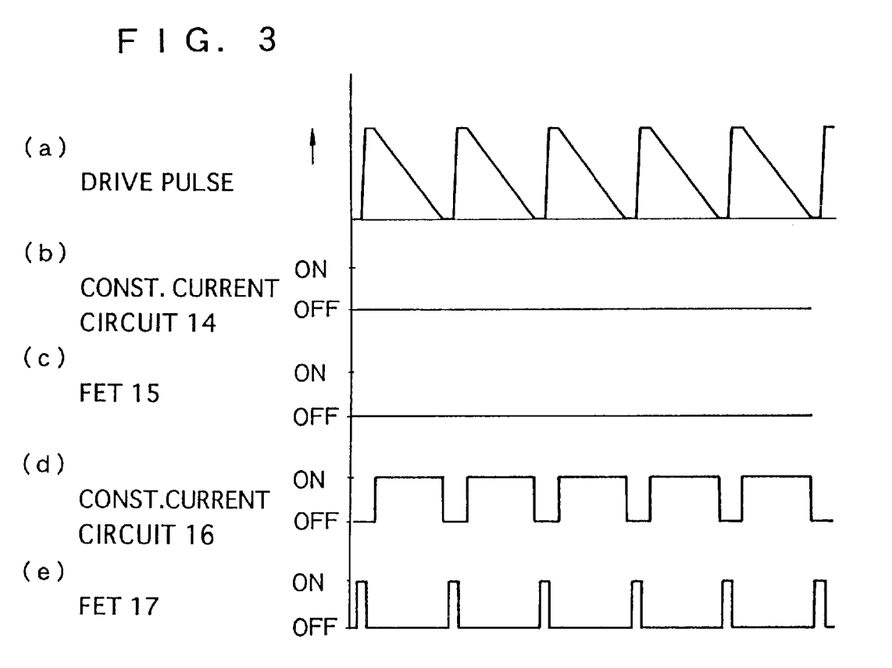
FIG. 3 is part 2 of a timing chart of the drive circuit showing the normal driving state of the first embodiment.

FET 17 is turned ON/OFF by the timing shown in FIG. 3(e) via PWM signals output from PWM circuit 12; the output from booster circuit 13 passes through FET 17 and rapidly charges piezoelectric element 21 because continuity is attained in the ON state. Constant current circuit 16 is turned ON/OFF by the timing shown in FIG. 3(d) via the PWM signals output from PWM circuit 12, such that the electrical load charged to piezoelectric element 21 is slowly discharged through constant current circuit 16 when said constant current circuit 16 is ON.

Since the piezoelectric element 21 is rapidly charged and slowly discharged, drive shaft 22 is rapidly expanded in the arrow a direction, then slowly contracted. Thus, lens holding frame 23 which is friction-bonded to drive shaft 22 via contact members 23a and 23b is moved in the opposite direction to the arrow a direction via the friction conditions and the speed difference of said expansion and contraction.

The ON/OFF timing of constant current circuits 14 and 15 and FET 15 and 17 provides a period when both constant current circuits and FET are turned OFF. This arrangement is provided because, when a period is not provided wherein both the constant current circuits and FET are turned OFF, the booster circuit output side becomes grounded when the constant current circuit and FET are simultaneously turned ON due to the response delay of the operating elements, such that circuit damage and abnormal increase in power consumption results.

Figure 4:
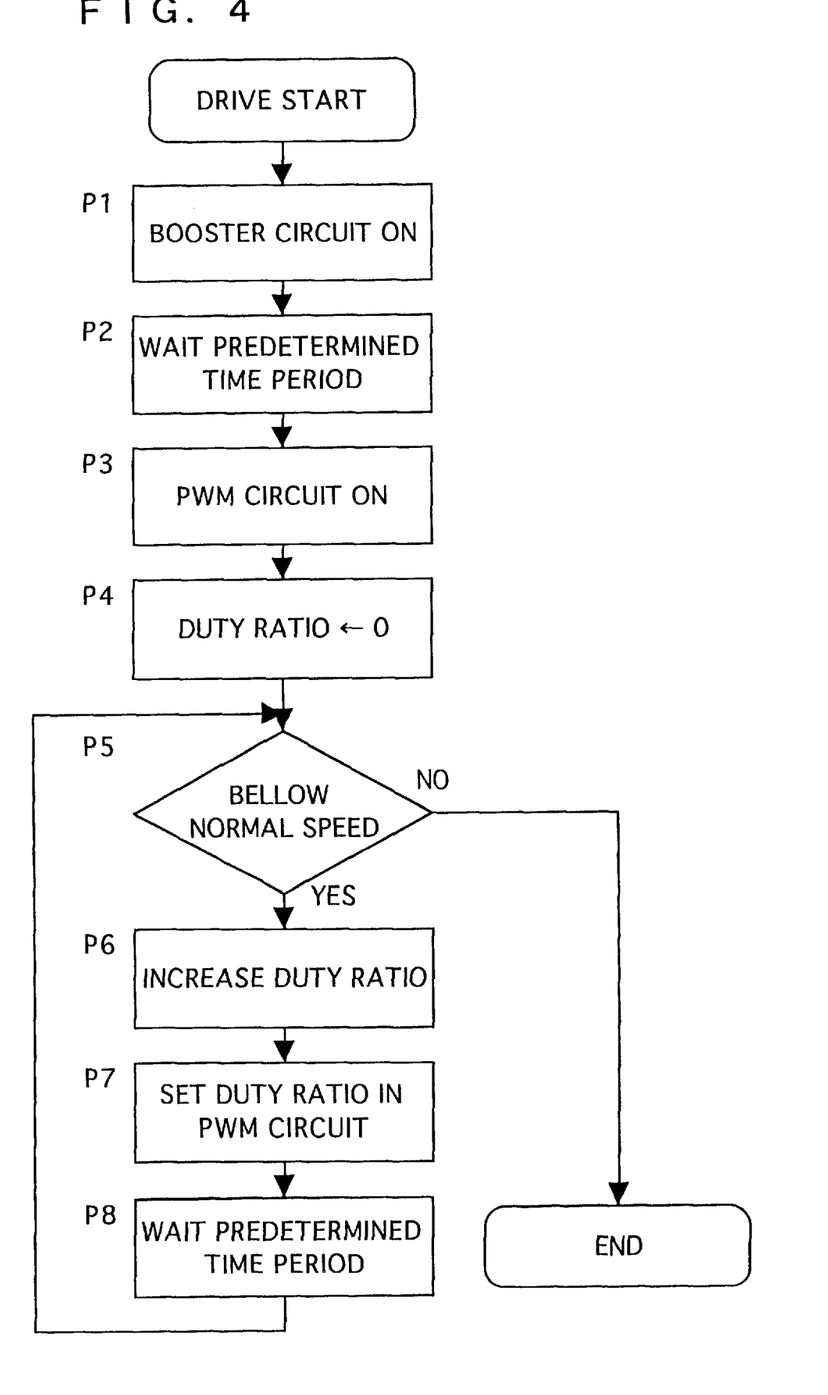
FIG. 4 is a flow chart illustrating the control operation when driving starts in the first embodiment.

Among the control operations of drive circuit 10, the control operation when driving starts is described below with reference to the flow chart of FIG. 4. First, booster circuit 13 is turned ON, and output stabilization is awaited (steps P1, P2). Then, PWM circuit 12 is turned ON, and the duty ratio D of the PWM signal output to the constant current circuit is set at [0], and the duty ratio D of the PWM signal output to the FET is set at a constant value (steps P3, P4). A check is made to determine whether or not the moving speed is a suitable speed for the normal state (step P5); when the moving speed is below the speed of the normal state, the duty ratio D of the constant current circuit is increased, and the updated duty ratio D used by the constant current circuit is set in PWM circuit 12 (steps P6, P7). The elapse of a predetermined period is awaited (step P8), then the routine returns to step P5, and if the moving speed is less than the speed of the normal state, the speed is gradually increased. When it is determined that the moving speed is suitable for the normal state in step P5, the control operation for starting the drive ends, and the routine advances to the control operation for the normal state.

In the aforesaid process, the electrical load charging piezoelectric element 21 or electrical load discharged by piezoelectric element 21 is controlled operating the constant current circuits 14 and 16 by gradually changing the duty ratio D used by the constant current circuit is set in PWM circuit 12 to accomplish a slow charge (discharge), thereby controlling the amount of telescopic movement of piezoelectric element 21. Thus, when driving is started the drive mechanism is driven at low speed and the speed can be gradually increased.

Figure 7:
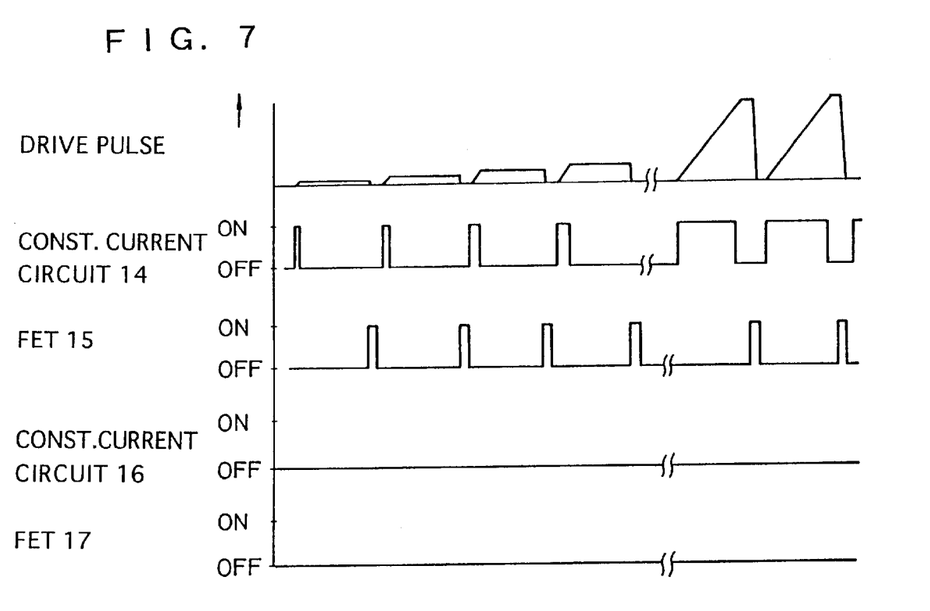
FIG. 7 is a timing chart showing the operation of the drive circuit when driving starts in the first embodiment.

FIG. 7 is a timing chart showing the ON/OFF timing of the constant current circuits and FET and the change in electrical load applied to the piezoelectric element when driving starts, and shows the gradual increase in the ON time of the constant current circuit accompanying the increase in the duty ratio D of the PWM signal, and the gradual increase in electrical load applied to the piezoelectric element.

Figure 5:
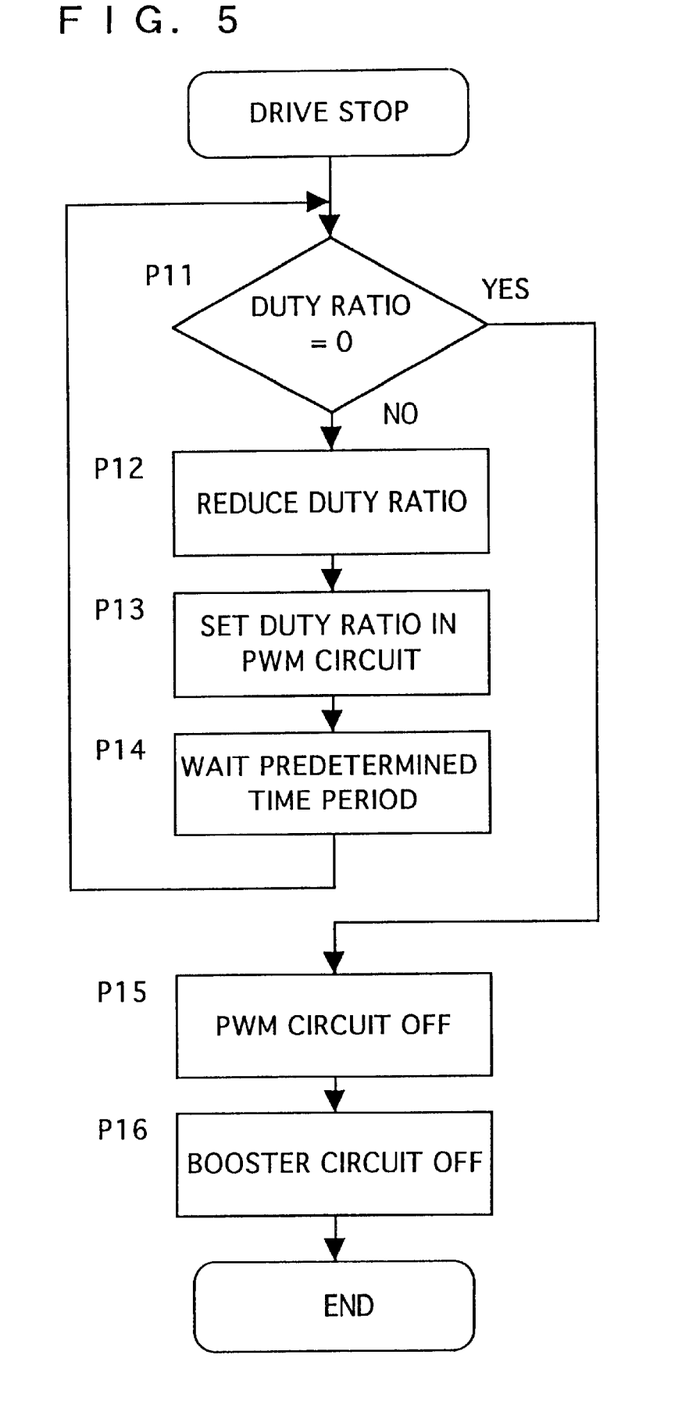
FIG. 5 is a flow chart illustrating the control operation when driving stops in the first embodiment.

Among the control operations of drive circuit 10, the control operation when driving stops is described below with reference to the flow chart of FIG. 5. A check is made to determine whether or not the duty ratio D is set at [0] (step P11). When the duty ratio D of the PWM signal output to the constant current circuit is not set at [0], the duty ratio D is reduced and the updated duty ratio D is set in PWM circuit 12 (steps P12, P13), the elapse of a predetermined time is awaited (step P14), after which the routine returns to step P11, and the moving speed is gradually decreased. When the duty ratio D is determined to be [0] in step P11, the PWM circuit 12 and booster circuit 13 are turned OFF because driving is stopped, and the process ends (steps P15, P16).

In the aforesaid process, the electrical load charging piezoelectric element 21 or electrical load discharged by piezoelectric element 21 is controlled operating the constant current circuits 14 and 16 by gradually changing the duty ratio D used by the constant current circuit is set in PWM circuit 12 to accomplish a slow charge (discharge), thereby controlling the amount of telescopic movement of piezoelectric element 21. Thus, when stopping the drive, the drive mechanism speed is gradually reduced until the mechanism eventually stops.

Figure 8:
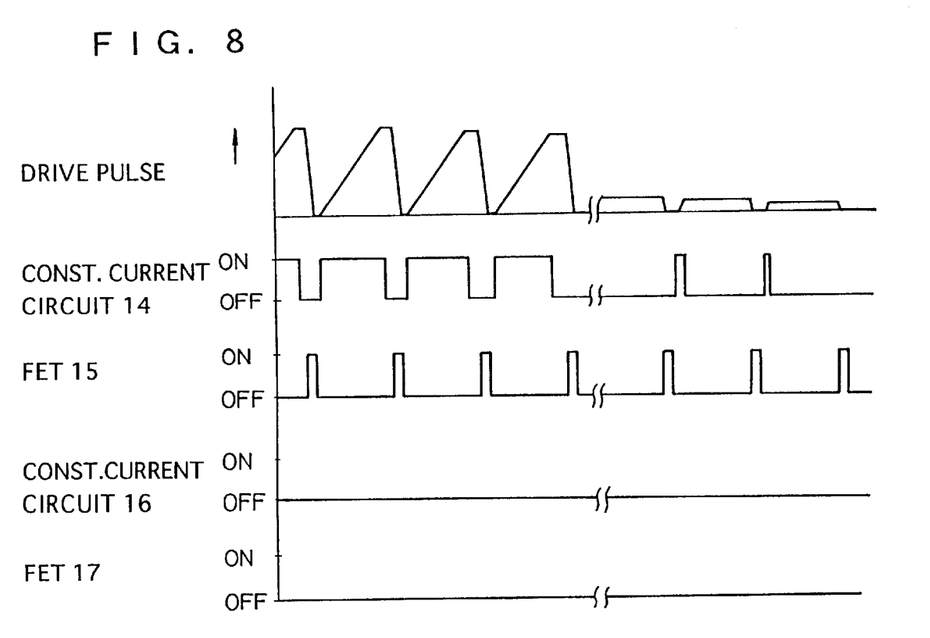
FIG. 8 is a timing chart showing the operation of the drive circuit when driving stops in the first embodiment.

FIG. 8 is a timing chart showing the ON/OFF timing of the constant current circuits and FET and the change in the electrical load applied to the piezoelectric element when the drive is stopped, and shows the gradual reduction of the ON time of the constant current circuit accompanying the reduction of the duty ratio D of the PWM signal, and the gradual decrease in the electrical load applied to the piezoelectric element.

Figure 9:
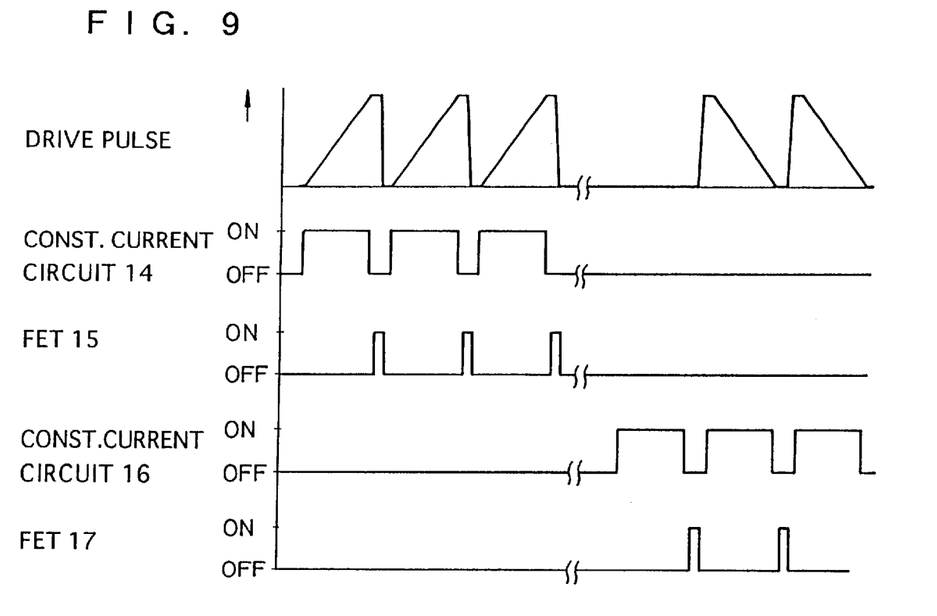
FIG. 9 is a timing chart showing the conventional operation of a drive circuit when the driving direction is reversed.

Among the control operations of drive circuit 10, the control operation when the driving direction is reversed is described below. FIG. 9 is a timing chart showing the ON/OFF timing of the constant current circuits and FET and the change in the electrical load applied to the piezoelectric element when the drive direction is reversed via a conventional drive control method. As can be clearly seen from FIG. 9, a non-operational period wherein the drive is temporarily stopped is provided when the drive direction is reversed by switching the drive from a positive direction of slow charging and rapid discharging of a piezoelectric element to a negative drive direction of rapid charging and slow discharging of the piezoelectric element.

In contrast, when the drive direction is reversed in the present invention, a preparation process is executed to prepare for driving in an opposite direction after the previously described process for stopping driving has ended and before the previously described process for starting driving is started.

This preparation process is a process for gradually changing the electrical load level applied to the piezoelectric element, thereby alleviating the impact when reversing the driving direction. This process is described below with reference to the flow chart of FIG. 6.

Figure 6:
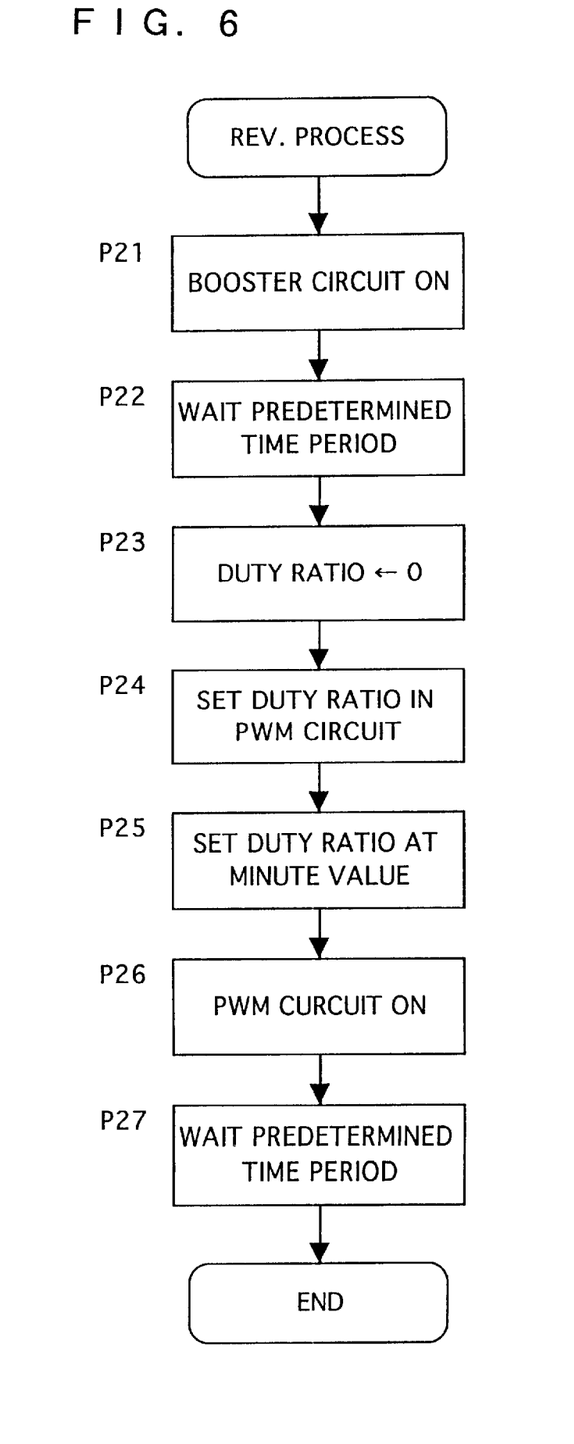
FIG. 6 is a flow chart illustrating the control operation when the driving direction is reversed in the first embodiment.

First, when the drive stopping operation ends, booster circuit 13 is turned ON, and output stabilization is awaited (steps P21, P22). Then, the duty ratio D is set at [0] (step P23), the duty ratio D of the constant current circuit is set at [0] in PWM circuit 12, and FET is turned OFF (step P23). The duty ratio D used by the constant current circuit is set at a minute value (e.g., $1/256$) (step P25), and PWM circuit 12 is driven at duty ratio D (minute value), and an operation is started to intermittently drive constant current circuit 14 to repeatedly slow charge (step P26). The elapse of a predetermined time (e.g., 10 ms) is awaited (step P27), after which the process ends.

Because the applied electrical load level gradually charges the piezoelectric element to start the drive starting operation in the reverse direction when a suitable charge accumulation has been attained, the drive shaft 22 is subjected to rapid expansion and contraction to stop the rapid movement of the lens holding frame 23 which is friction bonded to said drive shaft 22 via the contact members.

Figure 10:
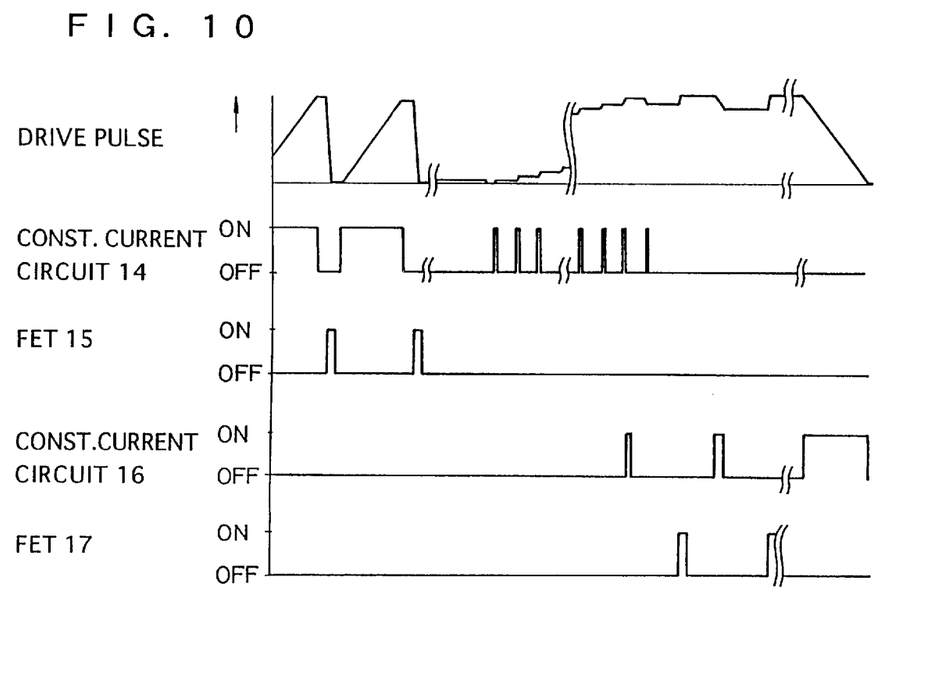
FIG. 10 is a timing chart showing the operation of the drive circuit when the driving direction is reversed in the first embodiment.

FIG. 10 is a timing chart showing the ON/OFF timing of the constant current circuits and FET and the change in the electrical load applied to the piezoelectric element when the driving direction is reversed, and shows the gradual change in the electrical load level applied to the piezoelectric element by repeated slow charging via intermittent driving of the constant current circuit 14.

A second embodiment of the present invention is described hereinafter. Although the first embodiment was described in terms of controlling the electrical load applied to the piezoelectric element by controlling the ON/OFF timing of the constant current circuits when driving is started, the second embodiment is constructed so as to control the electrical load applied to the piezoelectric element by controlling the output voltage of the booster circuit.

Figure 11:
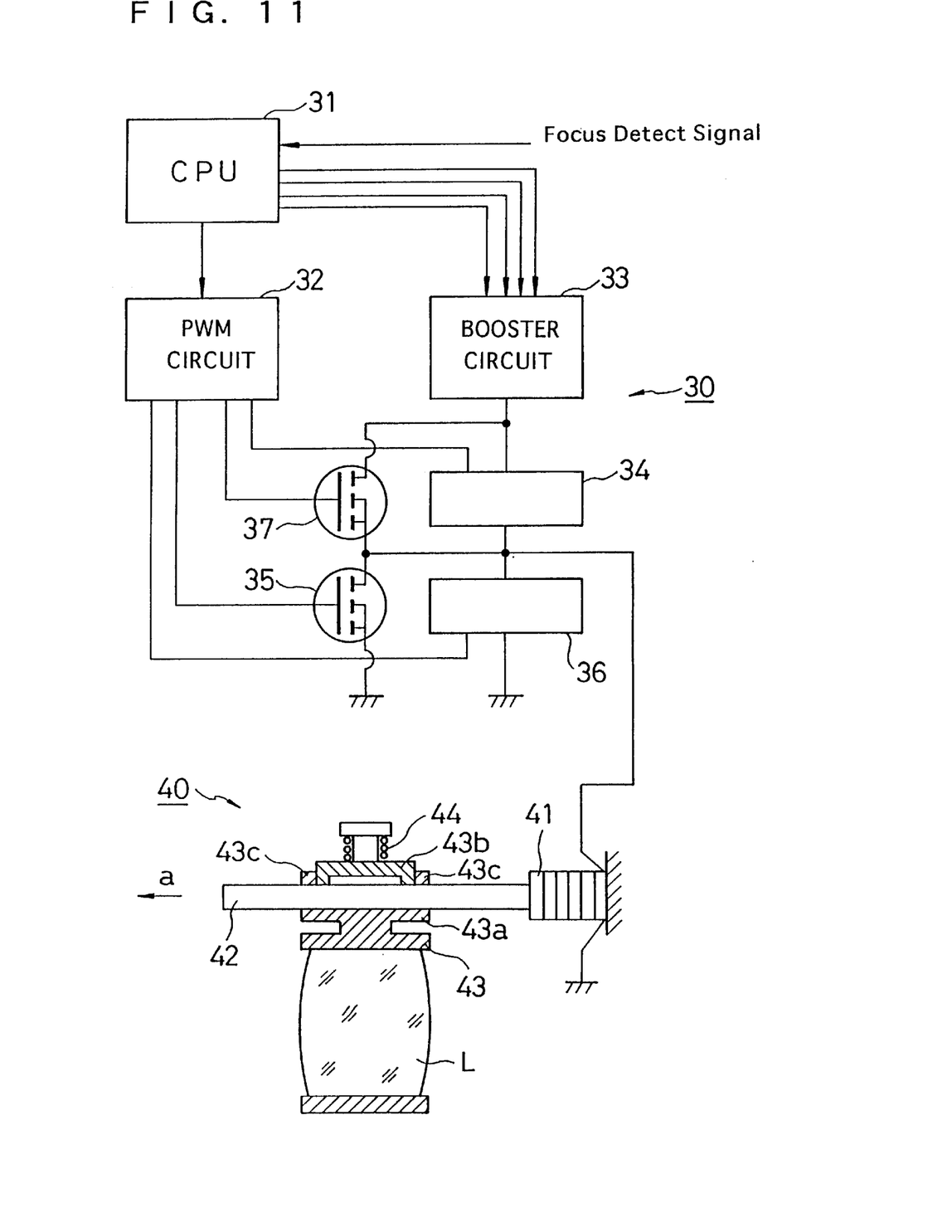
FIG. 11 is a block diagram of the drive circuit of a drive mechanism using a piezoelectric element of a second embodiment.

FIG. 11 is a block diagram of the drive circuit and drive mechanism using an electromechanical conversion element of the second embodiment. Although circuit construction is similar to that of the first embodiment, points of departure between the two embodiments include the controlling of the output voltage of the booster circuit by the CPU and different circuit operation in the second embodiment.

In FIG. 11, reference number 31 refers to a central processing unit (CPU) for controlling drive circuit 30; focus detection signals output from a focus detection circuit in the camera body (not illustrated) are input to the input port of said CPU 11. A pulse width modulation (PWM) circuit 32, and booster circuit 33 are connected to output ports of CPU 31. Reference numbers 35 and 37 refer to field effect transistors (FET), which are controllably turned ON/OFF by PWM signals output from PWM circuit 32 based on a duty ratio determined by CPU 31. Reference numbers 34 and 36 refer to constant current circuits which charge and discharge a piezoelectric element at predetermined constant currents.

The control operation of drive circuit 30 is described below. First, when the drive mechanism is in the normal drive state, operation is identical to that of the first embodiment. That is, in the normal drive state, PWM circuit 32 and constant current circuit 33 are in operational states, wherein PWM circuit 32 outputs PWM signals (ON/OFF control signals) to constant current circuit 34 and FET 35 based on a predetermined e duty ratio D suitable for normal drive and determined by CPU 31. At this time, constant current circuit 36 and FET 37 are maintained in the OFF state (refer to FIGS. 2(d) and 2(e)).

The constant current circuit 34 receives the PWM signal of the aforesaid duty ratio D, and is turned ON/OFF by the timing shown in FIG. 2(b), and during the ON period, output from booster circuit 33 passes through constant current circuit 34 and charges piezoelectric element by a constant current. Furthermore, FET 35 is turned ON/OFF by the timing shown in FIG. 2(c), and the electrical load charged to piezoelectric element 41 is rapidly discharged only during the continuity state when FET 34 is turned ON.

Since piezoelectric element 41 is slowly charged and rapidly discharged, the drive shaft 42 slowly expands in the arrow a direction, then rapidly contracts. Thus, lens holding frame 43 which is friction-bonded to drive shaft 42 via contact members 43a and 43b is moved in the arrow a direction under conditions of friction and the difference in speed of said expansion and contraction.

In order to move the lens holding frame 43 in the opposite direction relative to the direction of arrow a, the piezoelectric element 41 may be rapidly charged and slowly discharged in the same manner as in the first embodiment and, therefore, further details are omitted.

Figure 12:
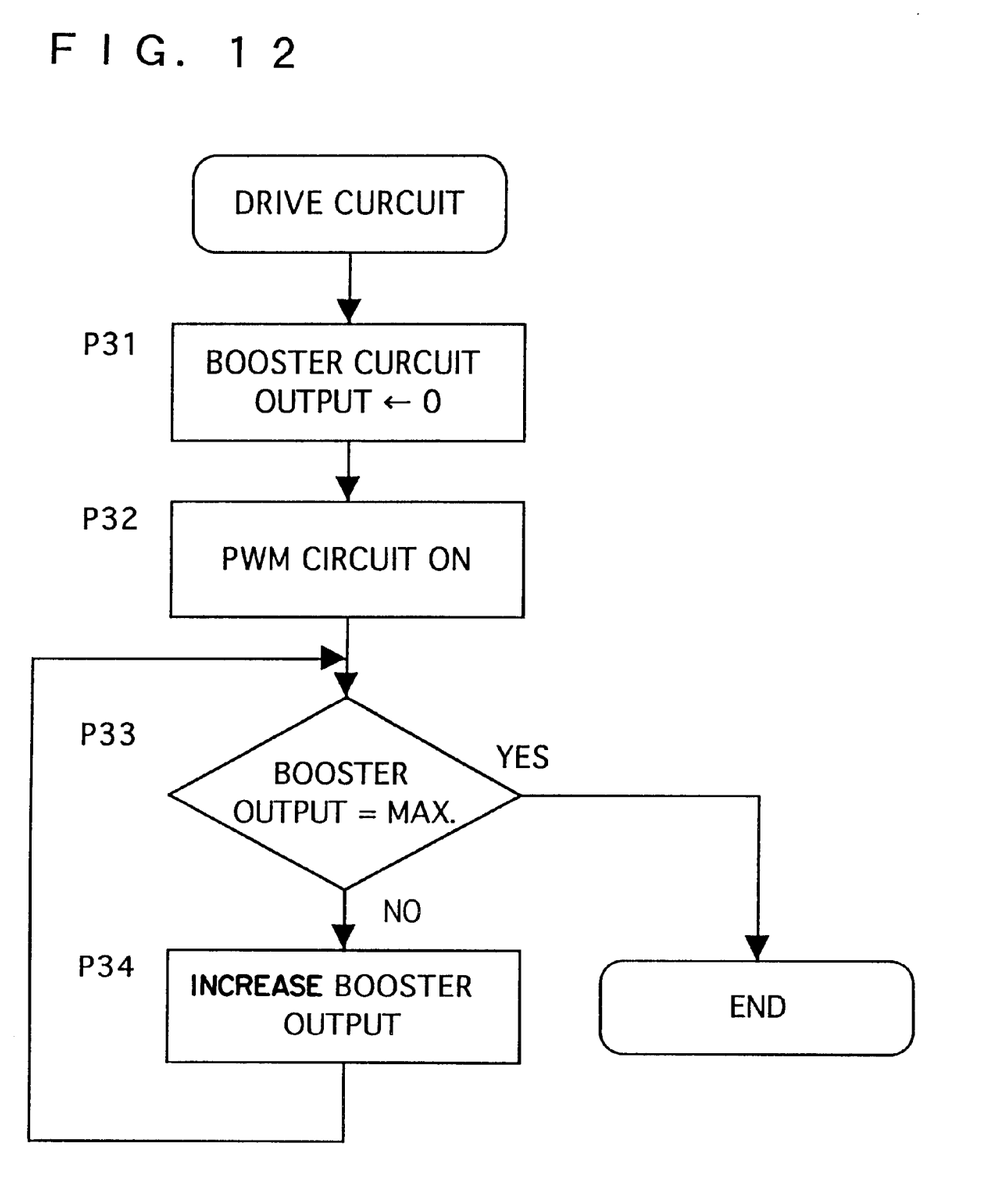
FIG. 12 is a flow chart illustrating the control operation when driving starts in the second embodiment.

Among the control operations of drive circuit 30, the control operation when the driving is started is described below with reference to the flow chart of FIG. 12. When booster circuit 33 is turned ON, the output voltage is set at [0] (step P31). Then, PWM circuit 32 is turned ON (step P32). A check is made to determine whether or not the output voltage of booster circuit 33 has attained a predetermined maximum value set beforehand in the booster circuit (step P33), and if said maximum value has not been attained (i.e., including the initially set [0] value), the output voltage of the booster circuit 33 is increased by a predetermined value (i.e., minute value) set beforehand (step P34), and the routine returns to step P33 and the operation is repeated until said maximum value is attained. When the output voltage determined in step P33 has attained the aforesaid predetermined maximum value, the drive start control operation ends, and the operation advances to control for the normal driving state.

Since the output voltage of the booster circuit 33 is gradually increased from a value of [0] in the aforesaid process, the voltage applied to the piezoelectric element through the constant current circuit 34, i.e., the electrical load, is gradually increased from [0] until a predetermined maximum value set beforehand is attained in the booster circuit even when the duty ratio D set in PWM circuit 32 by CPU 31 remains constant. Since the amount of telescopic displacement of the piezoelectric element is controlled by the output voltage of the booster circuit, the drive shaft is driven at slow speed when driving starts and gradually increased thereafter.

Figure 13:
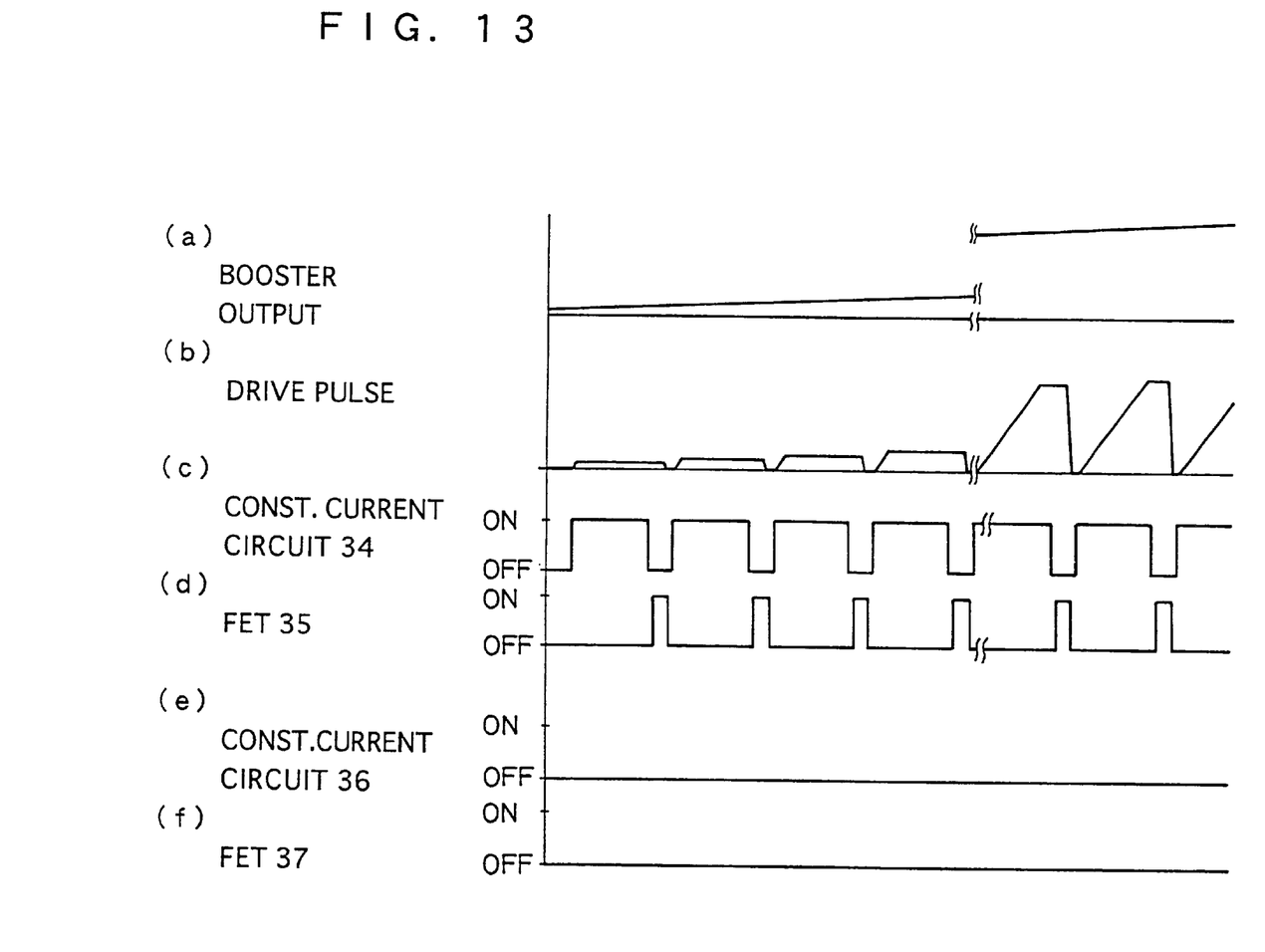
FIG. 13 is a timing chart illustrating the operation of the drive circuit when driving starts in the second embodiment.

FIG. 13 is a timing chart showing the ON/OFF timing of the constant current circuit and FET, and the change in output of the booster circuit and the electrical load applied to the piezoelectric element when driving starts, and shows the electrical load applied to the piezoelectric element via the constant current circuit 34 gradually increases even when the duty ratio D set in the PWM circuit 32 remains constant.

According to the preceding description, the present invention executes ON/OFF controls to apply a drive pulse or stop applying a drive pulse to an electromechanical conversion element when driving starts, driving stops, and the driving direction is reversed, and at such times the application time and application voltage of the drive pulse for the electromechanical conversion element is controllably gradually increased or gradually decreased so as to gradually increases or gradually decreased to control the driving speed. Thus, impact noise can be eliminated when driving starts, driving stops, and the driving direction is reversed because the driving speed of the drive mechanism can be smoothly changed when driving starts, driving stops, and the driving direction is reversed. Furthermore, since the frequency of the drive pulse is not changed when in use by the aforesaid drive means, drive mechanism resonance and vibration noise accompanying such resonance can be avoided besetting the frequency of the drive pulse beforehand at a frequency distant from the resonance frequency of the linear drive mechanism.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A drive mechanism comprising:
   an electromechanical conversion element for producing repeatable linear displacements in a predetermined direction;
   a first member fixedly connected to said electromechanical conversion element for simultaneous displacement therewith and having a guide surface formed in the direction of displacement of said electromechanical conversion element;
   a second member frictionally contacting with the guide surface of said first member;
   a pulse generator which applies drive pulses to said electromechanical conversion element, said drive pulses having a duty ratio; and
   a control means for controlling said pulse generator so as to change a driving speed of said electromechanical conversion element by controlling the electrical load applied to said electromechanical conversion element, said control means gradually increasing or decreasing the duty ratio of said drive pulses on a pulse-by-pulse basis so as to gradually increase or decrease the duration that the electric load is applied to said electromechanical conversion element,
   wherein an application voltage for said electromechanical conversion element gradually increases or decreases so as to control the driving speed of the electromechanical conversion element.

2. A drive mechanism as claimed in claim 1, wherein said control means controls said pulse generator by changing the voltage of the application of the drive pulse.

3. A drive mechanism as claimed in claim 1, wherein said control means gradually increases the duty ratio of said drive pulses applied to said electromechanical conversion element during the start of the driving operation.

4. A drive mechanism as claimed in claim 1, wherein said control means gradually reduces the duty ratio of said drive pulses applied to said electromechanical conversion element before the end of the driving operation.

5. A drive mechanism comprising:
- an electromechanical conversion element for producing repeatable linear displacements in a predetermined direction;
- a first member fixedly connected to said electromechanical conversion element for simultaneous displacement therewith and having a guide surface formed in the direction of displacement of said electromechanical conversion element;
- a second member frictionally contacting with the guide surface of said first member;
- a pulse generator;
- a first circuit which rapidly charges and discharges said electromechanical conversion element, said first circuit being turned ON/OFF via said pulse generator;
- a second circuit which slowly charges and discharges said electromechanical conversion element at a predetermined constant current, said second circuit being turned ON/OFF via said pulse generator; and
- a controller which changes a duty ratio of the pulse generator applied to said second circuit, said controller varying the duty ratio of said pulse generator so as to gradually increase or decrease the duration an electric load is applied to said electromechanical conversion element, said duty ratio being increased on a pulse-by-pulse basis,
- wherein an application voltage for said electromechanical conversion element gradually increases or decreases so as to control a driving speed of the electromechanical conversion element.

6. A drive mechanism as claimed in claim 5, wherein said controller gradually increases the duty ratio of said pulse generator during the start of the driving operation.

7. A drive mechanism as claimed in claim 5, wherein said controller gradually reduces the duty ratio of said pulse generator before the end of the driving operation.

8. A drive mechanism comprising:
- an electromechanical conversion element for producing repeatable linear displacements in a predetermined direction;
- a first member fixedly connected to said electromechanical conversion element for simultaneous displacement therewith and having a guide surface formed in the direction of displacement of said electromechanical conversion element;
- a second member frictionally contacting with the guide surface of said first member;
- a pulse generator;
- a first circuit which rapidly charges and discharges said electromechanical conversion element, said first circuit being turned ON/OFF via said pulse generator;
- a second circuit which slowly charges and discharges said electromechanical conversion element at a predetermined constant current, said second circuit being turned ON/OFF via said pulse generator; and
- a controller which gradually increases or decreases a voltage output by said second circuit so as to gradually increase or decrease the voltage level of drive pulses applied to said electromechanical conversion element on a pulse-by-pulse basis,
- wherein an application voltage for said electromechanical conversion element gradually increases or decreases so as to control a driving speed of the electromechanical conversion element.

9. A drive mechanism as claimed in claim 8, wherein said controller gradually increases the voltage output by said second circuit during the start of the driving operation.

10. A drive mechanism as claimed in claim 8, wherein said controller gradually reduces the voltage output by said second circuit before the end of the driving operation.

11. A drive mechanism comprising:
- a first member having a guide surface formed in a predetermined direction;
- a second member frictionally contacting with the guide surface of said first member;
- an electromechanical conversion element for producing repeatable linear displacements in the predetermined direction to move said first member and said second member relatively;
- a pulse generator which applies drive pulses to said electromechanical conversion element, said drive pulses having a duty ratio; and
- a controller for controlling said pulse generator so as to change a driving speed of said electromechanical conversion element by controlling the electrical load applied to said electromechanical conversion element, said controller gradually increasing or decreasing the duty ratio of said drive pulses on a pulse-by-pulse basis so as to gradually increase or decrease the duration that the electric load is applied to said electromechanical conversion element,
- wherein an application voltage for said electromechanical conversion element gradually increases or decreases so as to control the driving speed of the electromechanical conversion element.

12. A drive mechanism comprising;
- a first member having a guide surface formed in a predetermined direction;
- a second member frictionally contacting with the guide surface of said first member;
- an electromechanical conversion element for producing repeatable linear displacements in the predetermined direction of said guide surface to move said first member and said second member relatively;
- a driver which applies first drive pulses based on a first level and second drive pulses based on a second level to said electromechanical conversion element; and
- a controller for controlling said driver so as to change a relatively driving direction of said first member and said second member by controlling the electrical load applied to said electromechanical conversion element, said controller gradually changing a voltage between said first level and said second level,
- wherein an application voltage for said electromechanical conversion element gradually increases or decreases so as to control a driving speed of the electromechanical conversion element.

* * * * *